United States Patent [19]

Baylock

[11] Patent Number: 4,924,464
[45] Date of Patent: May 8, 1990

[54] TECHNIQUE FOR CONVERTING EITHER WAY BETWEEN A PLURALITY OF N SYNCHRONIZED SERIAL BIT STREAMS AND A PARALLEL TDM FORMAT

[75] Inventor: Gerald A. Baylock, Aberdeen, N.J.

[73] Assignees: American Telephone and Telegraph Company, New York, N.Y.; AT&T Bell Laboratories, Murray Hill, N.J.

[21] Appl. No.: 325,614

[22] Filed: Mar. 13, 1989

[51] Int. Cl.$^5$ .................................. H04J 3/07
[52] U.S. Cl. .......................... 370/112; 370/58.1; 370/99; 370/109
[58] Field of Search ............... 370/112, 99, 100, 109, 370/84, 110.1, 58, 67, 85; 341/100, 101, 102

[56] References Cited

U.S. PATENT DOCUMENTS

| | | | |
|---|---|---|---|
| 3,139,614 | 6/1964 | Gilson | 240/347 |
| 3,914,553 | 10/1975 | Melindo et al. | 341/101 |
| 3,953,837 | 4/1976 | Cheek, Jr. | 340/173 |
| 4,103,109 | 7/1978 | Maeding | 179/15 A |
| 4,138,596 | 2/1979 | Roche | 370/99 |
| 4,157,458 | 6/1979 | Roche | 370/112 |
| 4,236,830 | 12/1980 | Schlig | 357/24 |
| 4,377,843 | 3/1983 | Garringer | 364/200 |
| 4,520,480 | 5/1985 | Kawai | 370/109 |
| 4,646,290 | 2/1987 | Hills | 370/109 |
| 4,736,361 | 4/1988 | Cooperman et al. | 370/58 |
| 4,794,627 | 12/1988 | Grimaldi | 375/114 |
| 4,797,883 | 1/1989 | Kraus | 370/112 |
| 4,811,332 | 3/1989 | Carse | 370/58 |

OTHER PUBLICATIONS

Craig, *IBM Tech. Discl. Bull.*, vol. 17, No. 7, Dec. 1974, pp. 1887–1888.
Mathis, *IBM Tech. Discl. Bull.*, vol. 17, No. 10, Mar. 1975, p. 2985.

Primary Examiner—Douglas W. Olms
Assistant Examiner—Alpus H. Hsu
Attorney, Agent, or Firm—Erwin W. Pfeifle

[57] ABSTRACT

The present invention relates techniques for bidirectionally converting between a first format comprising N concurrent serial bit streams and a second format comprising a parallel TDM bit stream of N words using an array of storage elements, each bit stream comprising M-bits per word. In operation, the N words of the input bit stream(s) are sequentially shifted in a predetermined direction into the array of storage elements so that the N words lie parallel to each other along a first axis of the array. During the last clock period of the N words, the data associated with the storage elements not lying on a predetermined diagonal of the array are transposed across the predtermined diagonal so that the N words lie parallel to each other along a second orthogonal axis of the array. The transposed words are then shifted out of the array in the predetermined direction to provide an output for the converted output. Arrangements are provided for cases where N=M, where N does not equal M, and where the input and output clock rates are the same or different.

13 Claims, 7 Drawing Sheets

TECHNIQUE FOR CONVERTING EITHER WAY BETWEEN A PLURALITY OF N SYNCHRONIZED SERIAL BIT STREAMS AND A PARALLEL TDM FORMAT

TECHNICAL FIELD

The present invention relates to techniques for converting a plurality of N concurrent serial bit streams into a single parallel Time Division Multiplexed (TDM) bit stream, and vice versa, using bit transpositions in an N×M matrix of storage elements, where each serial and parallel bit stream comprises M-bit words.

DESCRIPTION OF THE PRIOR ART

In today's communication equipment, it is becoming more unusual for the major processing units to receive data from just one source. As the processing units are integrated into Very Large Scale Integration (VLSI), higher throughput becomes available in less space. The task of receiving the data from multiple sources and preparing, or pre-processing, it for the major processor in an efficient way can often be challenging. The task is twice as hard if the processed information needs to be sent to multiple destinations.

The design of the pre- and post-processing circuits must be very efficient if the benefits of the VLSI processor are to be taken advantage of. An efficient solution must not only be fast, it must also consume as little of the other equipment resources, e.g., power and space, as possible. Serial-to-parallel and parallel-to-serial conversions are common processes which must be done before and after the major processing.

A straight-forward approach for performing the serial-to-parallel transformations for one input line is via a well-known arrangement of an M-bit Shift Register including one input for receiving the serial bit stream and M outputs that can be concurrently gated to an M-bit input and M-bit output D-type Latch. In operation, where for example M=8, after 8 serial bits have been clocked into the Shift Register, the 8 bits are latched and held as a byte while the next 8-bits are being clocked into the Register. For multiple serial lines, each serial line would use a separate shift register and an associated latch. The eight parallel outputs of each latch would be connected to separate leads forming an 8-bit bus. By enabling the appropriate output or latch, the processor or user circuit sequentially reads the latches and processes the bytes. A parallel-to-serial converter is very similar in that the enabled latch captures the bytes from the bus and allows the shift register to parallel load the byte. The shift register then shifts the bits out in the required serial format.

Medium Scale Integration (MSI) integrated circuits (IC) provide an 8-bit shift register and an 8-bit latch in two separate 16-pin packages. New Large Scale Integration (LSI) ICs combine these functions in one IC. Assume that a circuit pack must process 8 serial input streams. Using the above LSI technology, sixteen 20-pin ICs would be required just to do the serial-parallel transformations, not including clock, latch and output enable generation means. Since space and speed are critical factors in most circuit designs, it becomes necessary to find more efficient means for performing this conversion.

Another arrangement is described in U.S. Pat. No. 4,377,843 issued to R. T. Garringer et al. on Mar. 22, 1983. There, a microprocessor-based Data Distribution Interface (DDI) is described by which a single Universal Asynchronous Receiver Transmitter (UART) is controlled and multiplexed for interfacing between a plurality of serial data terminals and an external parallel operating system. The serial-to-parallel process in the UART converts an incoming serial bit stream from one of the plurality of serial remote terminals into a parallel Time Divison Multiplexed format for transmission to the operating system. The central operating system executes its task on the parallel received signal and passes the return information to the DDI for the parallel-to-serial conversion by the UART prior to sending the serial bit stream to the intended data terminal. While the serial bit stream is being sent to a first remote data terminal a second serial bit stream can be converted into a parallel format for transmission to the central operating system for efficiency purposes. Such DDI, however, cannot receive plural concurrent serial bit streams from the remote data terminals, and includes many elements in the DDI to provide the single momentary serial-to-parallel and/or parallel-to-serial conversion.

The problem in the prior art is to provide a efficient and simple means for converting between multiple concurrent serial bit streams and a single parallel time division multiplexed (TDM) bit stream.

SUMMARY OF THE INVENTION

The foregoing problem in the prior art has been solved in accordance with the present invention which relates to method and apparatus for converting a plurality of N concurrent serial bit streams into a single parallel TDM format, and vice versa, where each bit stream comprises words of M-bits each and the serial bit streams are preferably synchronized. More particulary, conversion apparatus according to the present invention comprises a matrix of storage elements which are coupled on one side of the matrix to N first input/output terminals, each first terminal being coupled to a separate serial communication link; and on the opposing side of the matrix to M second input/output terminals which are coupled to an M-bit parallel bus. In operation, in a continuous sequence the synchronized M-bit words from the plurality of N serial links, or the plurality of N M-bit words from the TDM parallel bus, are stored in the matrix of storage elements before the bits in certain storage elements are transposed about a predetermined diagonal of the matrix to convert either the serially stored bits into the parallel format, or vice versa.

Other and further aspects of the present invention will become apparent during the course of the following description and by reference to the accompanying drawings.

BRIEF DESCRIPTION OF THE DRAWINGS

Referring to the drawings where like numerals represent like parts in the several figures:

FIG. 5 illustrates the sequence performed in providing the serial-to-parallel conversion in the arrangement of FIG. 4;

DETAILED DESCRIPTION

Figure 1:
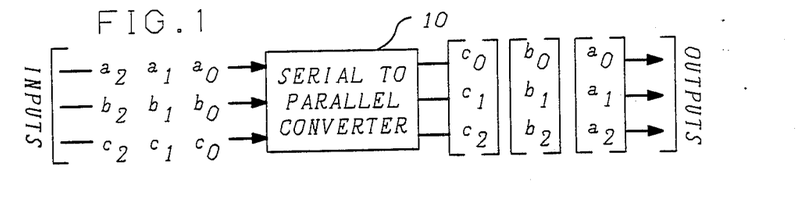
FIG. 1 is a block diagram illustrating the conversion of three concurrent serial bit streams comprising 3-bit words that are converted into a parallel TDM format in accordance with the present invention.

FIG. 1 illustrates the general case where three concurrent serial input bit streams (a–c), comprising 3-bits per word (0–2) each, are converted into a parallel Time Division Multiplexed (TDM) bit stream in a serial-to-parallel converter 10 in accordance with the present invention. It is to be understood that converter 10 of FIG. 1 can also be used to convert a TDM parallel input bit stream into three concurrent serial output bit streams by providing the parallel bit stream to the inputs instead of the three concurrent serial bit streams. For purposes of description hereinafter, it is assumed that each of the three serial bits streams designated a–c, or the resultant parallel TDM bit stream, comprises words of three elements or bits denoted by subscripts 0–2 as shown in FIG. 1. It is to be understood that the description hereinafter for the three serial bit streams is merely for purposes of exposition and not for purposes of limitation, since such description can be applied to the general arrangement where there are N serial bit streams with M bits/word, and also for a parallel-to-serial conversion.

Figure 2:
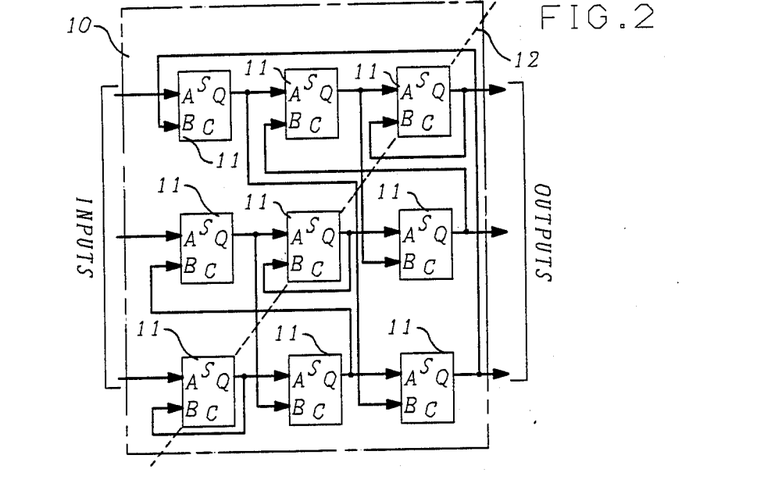
FIG. 2 is a block diagram of an arrangement for performing the serial-to-parallel conversion as shown in FIG. 1, or vice versa.

FIG. 2 is a block diagram of an exemplary converter 10 for effecting either a serial-to-parallel or parallel-to-serial conversion between 3 exemplary concurrent serial bit streams (N=3) and a TDM parallel bit stream, where each bit stream comprises 3-bit words (M=3). Converter 10 comprises an array of 9 storage elements 11 and associated interconnections, where each storage element is disposed in a separate fixed position in a 3×3 matrix which includes a predetermined diagonal 12. The horizontal interconnects are used to shift information, or bits, into, through, and out of the matrix based on predetermined clock pulses. In accordance with the present invention, once the three 3-bit words associated with the three serial bit streams, or the TDM parallel bit stream, are gated into the matrix, an interchange of the information stored in the off-diagonal elements via the non-horizontal interconnections is effected to complete the conversion. Those storage elements 11 on diagonal 12 which do not have non-horizontal interconnections retain their stored bit and define the diagonal 12.

As shown in FIG. 2, each storage element 11 comprises an "A" input which is selected during horizontal clocking, a "B" input which is selected during non-horizontal clocking, an "S" input for receiving a control signal that selects either the A or B input, a "C" input that receives the clock pulses, and a "Q" output. Such storage element 11 can be formed from a combination of a 2:1 multiplexer, which has the A, B and S inputs and a Y output, connected to the D input of a D-type Flip Flop which also includes a clock (C) input and the Q output. It is to be understood that the described storage element is provided for exemplary purposes only, and that any suitable storage element can be substituted that functions as described and still be within the scope of the present invention. In the matrix of converter 10, all of the Select (S) inputs are preferably connected together to concurrently receive a select control signal provided by a source (not shown), and similarly all of the clock (C) inputs would preferably be connected together to concurrently receive approximately timed clock pulses from a source (not shown).

Figure 3:
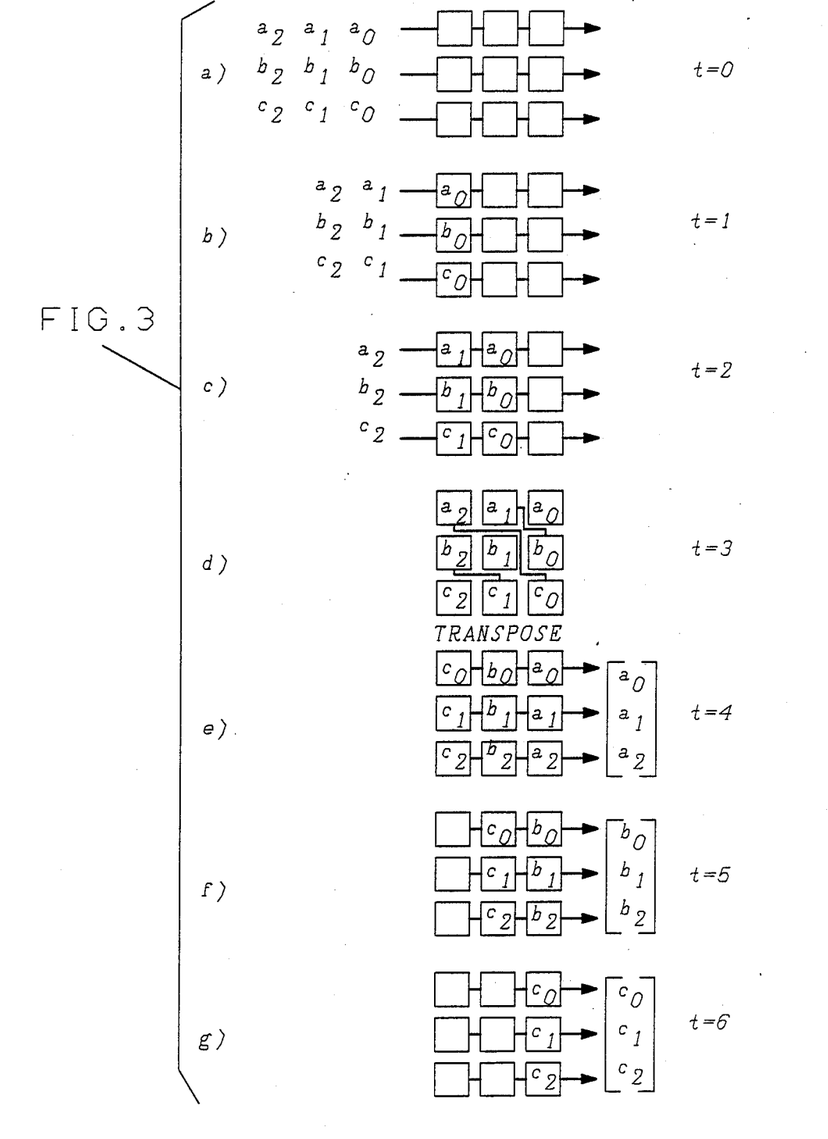
FIG. 3 illustrates the sequence performed in providing the serial-to-parallel conversion in the arrangement of FIG. 2.

FIG. 3 illustrates the operation sequence of the matrix of FIG. 2 for the conversion of 3 concurrent synchronized serial input bit streams into a TDM parallel output bit stream. In step (a), or time period=0, the 3-bit words of the three serial bit streams are shown prepared to enter the matrix of converter 10. In steps (b)–(d), or time periods=1–3, respectively, the three bits of the words of each of the three serial bit streams are sequentially clocked horizontally into a separate row of the matrix using the A, or horizontal shift, inputs of the matrix storage elements. Just after the end of step (d), and after the 3-bit words have been entered into the matrix as shown in step (d) of FIG. 3, the alternate B inputs to the 9 storage elements are selected to exchange the information in the off-diagonal storage elements. The result of such off-diagonal exchange is pictured in the matrix of step (e), where during the time period=4 of step (e), the first parallel word associated with serial bit stream "a" is outputted from the matrix onto a parallel bus. During steps (f) and (g) the remaining two converted parallel words for input serial bit streams "b" and "c" are outputted from the matrix to complete the conversion of the three concurrent serial bit streams into a TDM parallel format. It is to be understood that during steps (e) to (g) in FIG. 3, the next word of each of the three serial bit streams is clocked into the matrix similar to steps (b) to (d).

The arrangement of FIG. 2 can also be used to perform a parallel-to-serial conversion by shifting the TDM 3-bit words of the parallel bit stream into the matrix inputs at the left of FIG. 2 similar to the sequence of steps (b)–(d) for the serial words of FIG. 3. Once the 3 parallel words a–c are stored in the matrix, the exchange of off-diagonal elements is performed using the B inputs of the storage elements as described for step (d) of FIG. 3 to place the parallel words a–c into the serial format in the rows of the matrix. The serially formed words are then outputted from the matrix during time periods 4–6. In the arrangement of FIGS. 2 and 3, the flow of information from the serial inputs towards the parallel output, or vice versa, is stopped momentarily in step (d) to allow the transpositions, or conversion, to take place.

Figure 4:
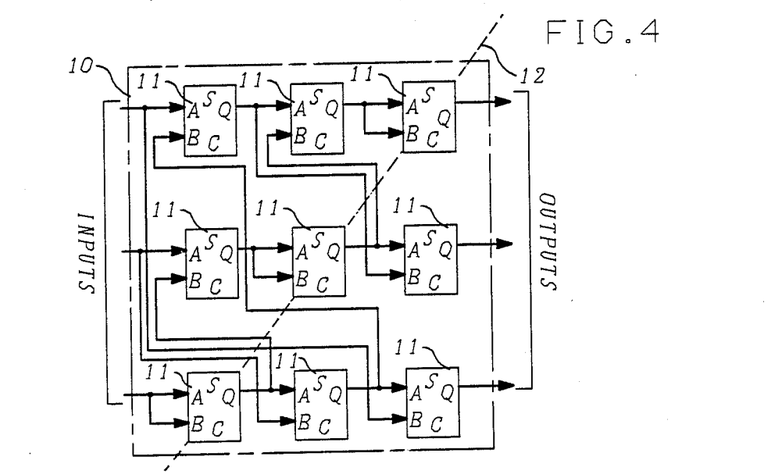
FIG. 4 illustrates a block diagram of an alternate arrangement similar to FIG. 2 for performing the serial-to-parallel conversion shown in FIG. 1, or vice versa.

A simple modification can be made which would allow the flow of information to continue throughout the entire process without a pause to perform the conversion. This improvement leads to an array in converter 10 which is synchronous and continuous and is shown in FIG. 4, while the flow of information for a serial-to-parallel conversion through the matrix is shown in FIG. 5. The difference between the matrices of FIGS. 2 and 4 is in the interconnections of the B or alternate inputs with the points on the horizontal paths of each matrix. As shown in FIG. 5, during time periods 1 and 2 the first two bits of the three serial words a–c are shifted into the associated row of storage elements 11. During time period 3, the alternate B inputs of the storage elements 11 are selected which causes the third bit of each of serial words a–c to be shifted into the matrix via the non-horizontal interconnections while concurrently converting the serial words into the parallel format. At this point in time, the parallel format "a" word is available at the outputs. During the next three time periods 4–6, the remaining "b" and "c" converted parallel words are available from converter 10 in the TDM parallel format (during periods 4 and 5) concurrent with the next serial words of bit streams a–c being clocked into the matrix and converted to the parallel format. A parallel-to-serial conversion can also be performed with the arrangement of FIG. 4, by inputting the TDM parallel words a–b during time periods 1 and 2 and using the alternate B inputs of storage elements 11 during time period 3 to enter parallel word "c" into the matrix via the non-horizontal interconnections and thereby concurrently complete the conversion to the serial format. During time periods 4–6 the serial converted words would be outputted while the next three parallel words a–c are inputted and converted into the serial format.

Figure 7:
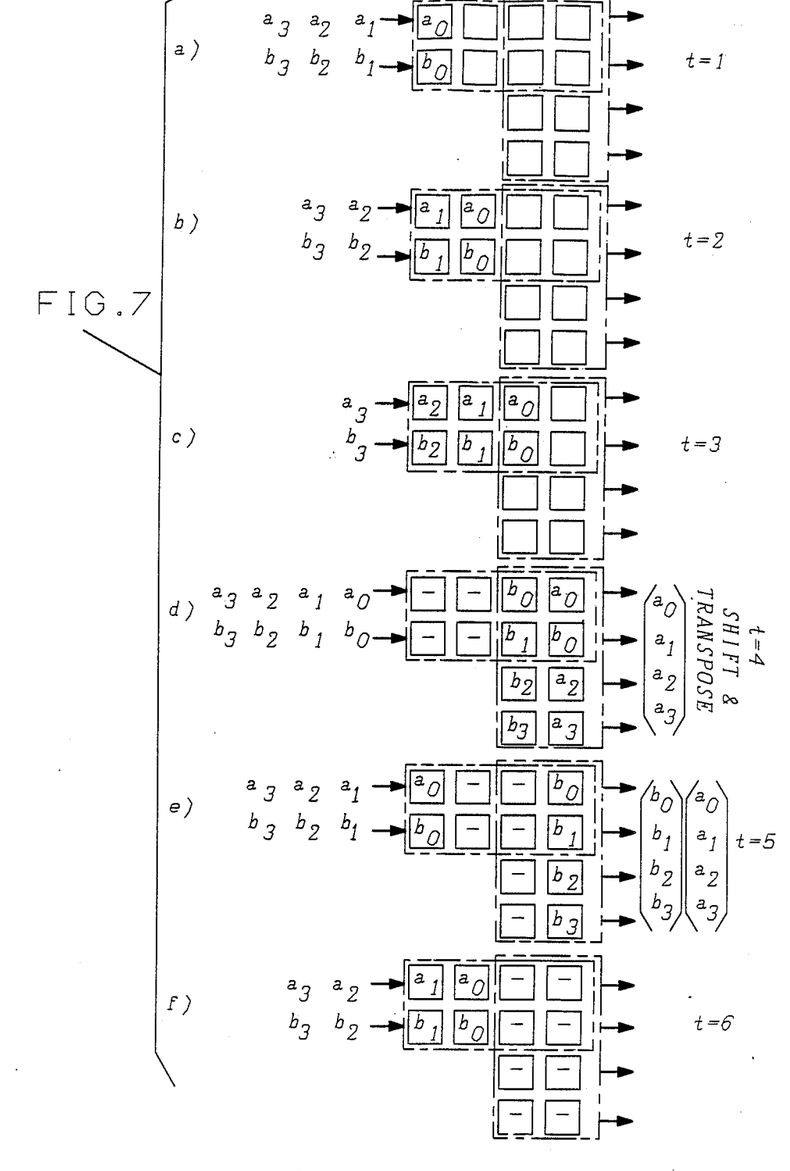
FIG. 7 illustrates the sequence performed in providing the serial-to-parallel conversion in the arrangement of FIG. 6.

The description hereinbefore has been directed to the condition of N=M, where the number of input lines (N) to be converted either way between the serial and parallel formats is equal to the number of bits per word (M). The array 10 architecture can be extended to the general case of an N×M matrix, where N also defines the number of rows and M also defines the number of columns. For an exemplary serial-to-parallel conversion of two serial bit streams with 4-bit words each, the storage elements 11 of input matrix 10 are formed in a 2×4 matrix and includes the minimal number of twelve storage elements shown in the arrangement of FIG. 3. If the 2×4 matrix is interconnected in the manner of the matrix of FIG. 2, then the sequence of operation is shown in FIG. 7. More particularly, during the first 4 clock periods the serial words are shifted into the two 4-element rows, and at the end of the fourth clock period the conversion is made into the two word parallel format by selecting the alternate B inputs to the storage elements. During the next two clock periods the two parallel words are shifted out of the matrix on a parallel bus while the first two bits of the next serial words are shifted into the matrix.

Figure 8:
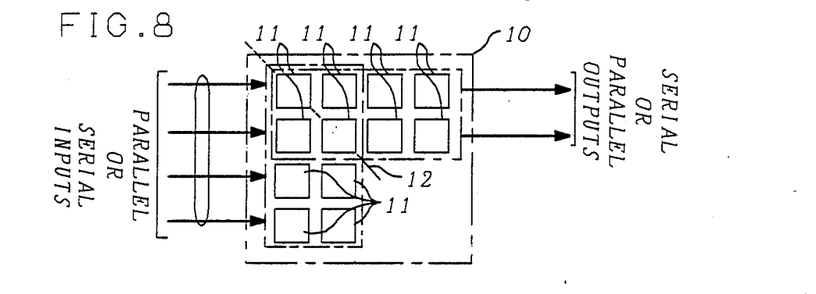
FIG. 8 illustrates a block diagram of an arrangement corresponding to the inverse of FIG. 6 for providing a parallel-to-serial conversion where the number of concurrent serial output bit streams are less than the number of bits per word.

From FIG. 7 it can be seen that such conversion introduces two parallel words with no information therein which creates a two-word pause in the array throughput every N words. Such pause corresponds to the concept of "bit-stuffing". If the matrix were interconnected with non-horizontal interconnections similar to the arrangement of FIG. 4, there still would be a two-word pause in the array throughput because the input clock equals the output clock rate and there are double the number of outputs as inputs producing a one-half utilization of the output capacity. FIG. 8 illustrates an array 10 that corresponds to the reverse of the array of FIG. 6 for performing the conversion of a 2-word, 4-bit/word, parallel TDM format into a two concurrent word serial format. The arrangement of FIG. 8 also would have to provide a 2-word pause between each pair of parallel input words to avoid overwriting the last two bits of the converted serial words as they are shifted out of the array.

Figure 6:
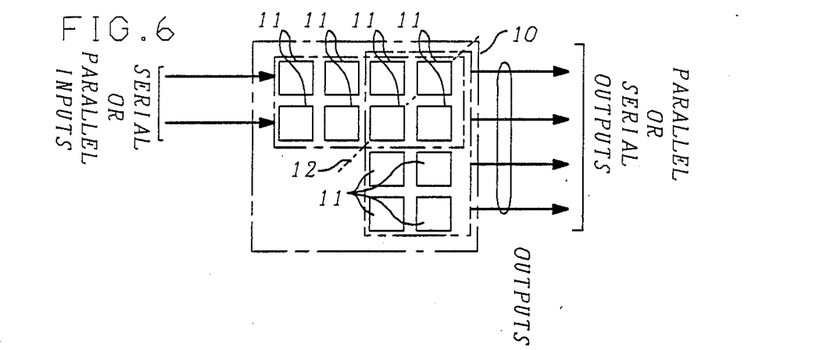
FIG. 6 illustrates a block diagram of an arrangement for providing a serial-to-parallel conversion where the number of concurrent serial bit streams are less than the number of bits per word.
Figure 9:
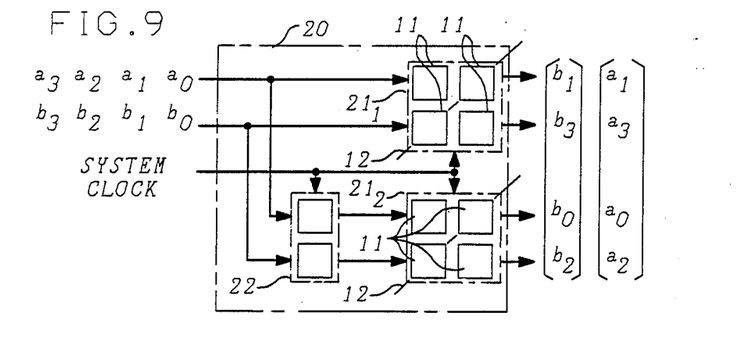
FIG. 9 is a block diagram of an alternate arrangement to that of FIG. 6 for providing a serial-to-parallel conversion where the number of concurrent serial input bit streams are less than the number of bits per word.

If such pauses in array throughput are unacceptable, then an architecture is required, for example, where the array output format appropriately differs from the array input format. An exemplary array 20 for providing such different input and output formats is shown in the arrangement of FIG. 9, where the exemplary two concurrent serial bit streams of 4-bits per word are converted into a parallel TDM format. In FIG. 9, the single array 10 architecture of FIG. 6 is changed into a master array 20 with two inputs (N) and four outputs (M) that comprises two 2×2 matrices $21_1$ and $21_2$ of four storage elements 11 each, and a pre-latch block 22 at the input to one of matrices 21. Preferably, each matrix 21 is interconnected with the non-horizontal "B" interconnections arranged similar to that shown in FIG. 4.

Figure 10:
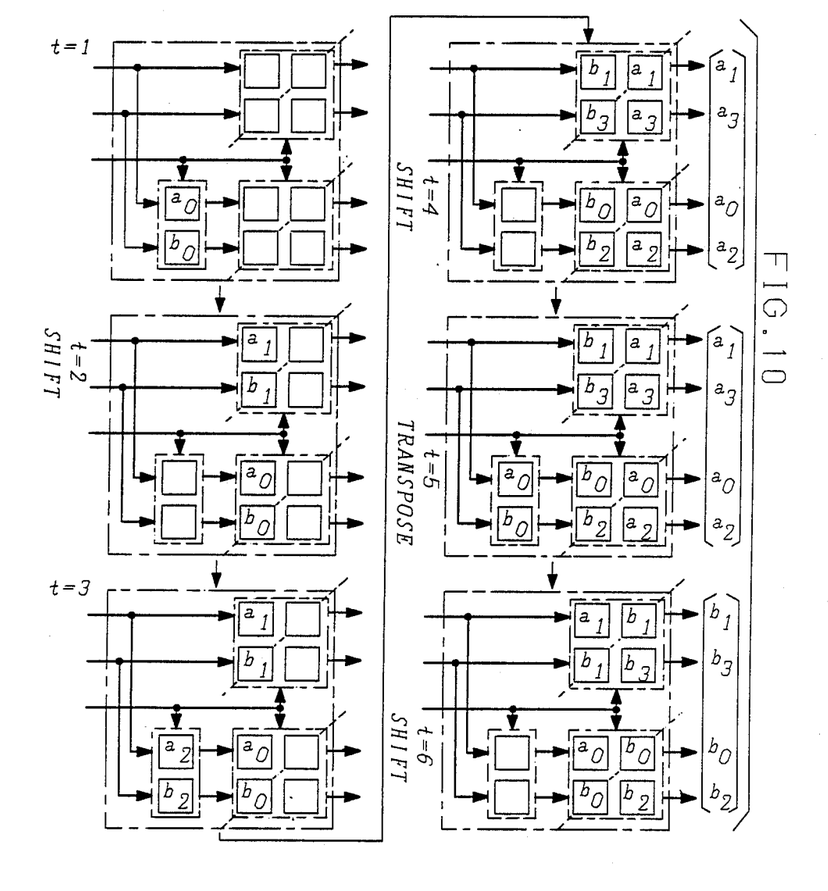
FIG. 10 illustrates the sequence performed in providing the serial-to-parallel conversion in the arrangement of FIG. 9.

To avoid the "bit-stuffing" or pauses in the array throughput the input format of the two concurrent serial bit streams is multiplexed at twice the array 20 clock frequency. More particularly, during the first clock period of array 20, both bits $a_0$ and $b_0$ and then $a_1$ and $b_1$ are presented to the inputs of array 20. The pre-latch block 22 functions to sample the information of the two serial input lines when bits $a_0$ and $b_0$ are presented to the inputs of array 20, and holds these bit values for presentation to the inputs of bottom array $21_2$, as shown for serial bit stream clock period t=1 of FIG. 10. When bits $a_1$ and $b_1$ of the serial bit steams are presented at the two inputs of the top matrix $21a$, both matrices $21_1$ and $21_2$ are clocked and select the horizontal "A" inputs of storage element 11 so that both matrices 21 receive and temporarily store their first input samples as shown at t=2 of FIG. 10. This sequence is repeated for bits $a_2$ and $b_2$ and then bits $a_3$ and $b_3$ as shown in t=3 and t=4 of FIG. 10 except that the four concurrent bits are clocked into matrices $21_1$ and $21_2$ during T=4 using the non-horizontal "B" interconnections of storage elements 11 to concurrently shift the four bits into the matrices while converting the serial format into a parallel format. At the end of t=4, the parallel converted word "a" is available as an output from matrices $21_1$ and $21_2$. During t=5 of the serial bit stream clock shown in FIG. 10, bits $a_0$ and $b_0$ of the next two consecutive words of the serial bit stream are sampled and held by pre-latch 22. Then, during t=6 of FIG. 10 (corresponding to the third array 20 clock period), the first two bits of the next consecutive words of the serial bit streams are clocked into matrices 21 while the final parallel converted word "b" is available as an output of matrices 21. It is to be understood that the output elements of the parallel words can easily be re-ordered by simple routing of the output lines, and that the concept can easily be extended to the general case of arrays where there are less input lines than output lines. The arrangement of FIG. 9 can also be used to convert a series of four 2-bit prallel words, which are introduced to pre-latch 22 and matrices 21 into four concurrent serial output bit streams of 2-bits/word each using the sequence of FIG. 10.

Figure 11:
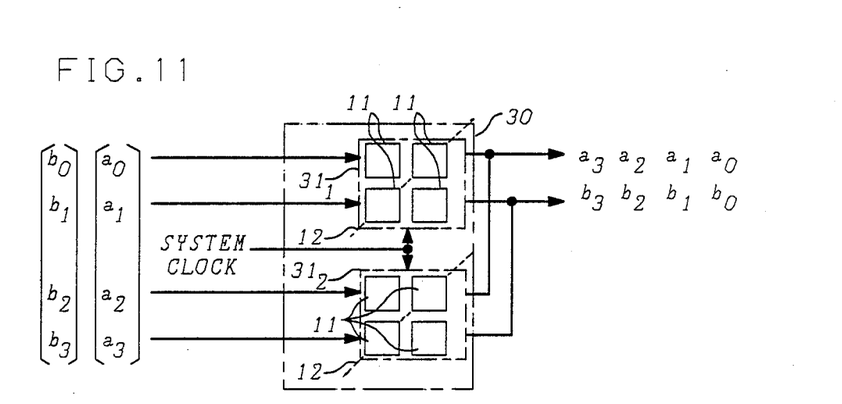
FIG. 11 is a block diagram of an inverse arrangement similar to FIG. 9 for performing a parallel-to-serial conversion where the number of concurrent serial output bit streams is less than the number of bits per word.

For the case where there are more input lines than output lines, (N>M) as shown for example for the parallel-to-serial converter of FIG. 8, twice as much data enters the array 30 on the four parallel input lines as can leave the array on the two serial lines. As described hereinbefore, bit-stuffing would be required in the parallel word input bit stream of the array of FIG. 8, to avoid overwriting serial data leaving the array. An arrangement for avoiding bit-stuffing for the case where there are four input lines and two output lines, is shown in FIG. 11 which effectively doubles the output information rate. The array 30 of FIG. 11 comprises a first and second 2×2 matrix designated $31_1$ and $31_2$, respectively, of 4 storage elements 11 each, with each of the corresponding outputs of the two matrices connected together.

Figure 12:
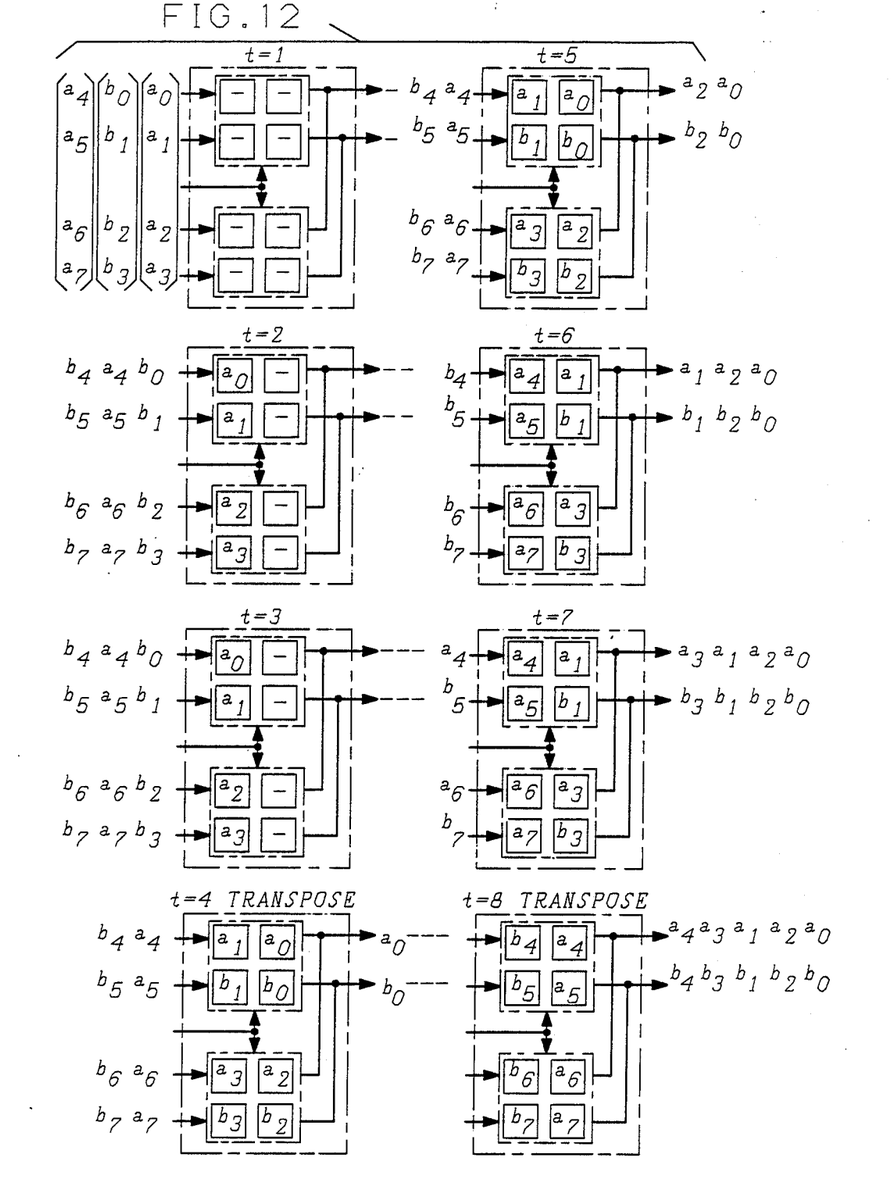
FIG. 12 illustrates the sequence performed in providing the parallel-to-serial conversion in the arrangement of FIG. 11.

In operation, to avoid contention on the two output lines, the top matrix $31_1$ of storage elements 11 is arranged to enable its outputs during a first portion of the array 30 clock period. The bottom matrix $31_2$ of storage elements 11, in turn, enables its two outputs during a second portion of the array 30 clock period where the first and second portions can be sequenced in any order. Therefore, for the exemplary arrangement where the first portion of the array clock period precedes the second portion of the array, during the first array 30 clock period, the four bits of the "a" parallel word are clocked into the left-hand storage elements 11 of matrices $31_1$ and $31_2$ using the "A" horizontal inputs, as shown in t=2 of FIG. 12. During the second array 30 clock period, the four bits of the "b" parallel word are clocked into array 30 using the "B" non-horizontal inputs to storage elements 11 to concurrently perform the parallel to-serial conversion, as shown in T=4 of FIG. 12. At this point the $a_0$, $a_2$, $b_0$, and $b_2$ bits. are available to the two serial output lines of matrices 21, with any well-known gating means (not shown) being arranged to make, for example, bits $a_0$ and $b_0$ from matrix $31_1$ directly available to the serial output lines at the end of t=4 of FIG. 12, while inhibiting the bits $a_2$ and $b_2$ until time period t=5 corresponding to the first portion of the next array clock cycle. During the second half of the same next array clock period, as shown in t=6 of FIG. 12, the bits $a_1$, $b_1$, $a_3$ and $b_3$ are shifted using the A horizontal inputs to storage elements 11 concurrent with the next parallel word being shifted into the left-hand storage elements 11 of matrices $31_1$ and $31_2$. The sequence then continues in the manner described hereinabove. It is to be understood that the above concept can be extended to the general concept of N×M arrays where N is other than four inputs and are greater in number than the M outputs and M is other than two outputs. The arrangement of FIG. 11 can also be used to convert four concurrent serial bit streams of 2-bits/word each, which are introduced to the inputs of FIG. 11, into a TDM parallel output bit stream using the sequence of FIG. 12.

What is claimed:

1. A method of performing a conversion in either direction between (1) a first format comprising a plurality of N concurrent serial bit streams including M-bit words at a first predetermined bit rate, and (2) a second format comprising a parallel Time Division Multiplexed (TDM) bit stream including N sequential M-bit words at a second predetermined bit rate, the method comprising the steps of:
   (a) sequentially shifting at least all but one of received sets of concurrent bits of the plurality of N words of either one of the first or second input formats in a predetermined direction into an array of storage elements at the predetermined bit rate of the input format, so that the bits of the N words shifted into the array are aligned parallel to each other along a first axis of the array;
   (b) during a period when the last set of concurrent bits of the plurality of N words are entered into the array, shifting the bits of the N words to transposed positions within the array so that the N words are arranged parallel to each other in the storage elements along a second axis of the array; and
   (c) sequentially transmitting the M-bits of the N transposed words from step (b) in the predetermined direction out of the array at the predetermined bit rate of the converted output format to complete the conversion in either direction between the first and second format.

2. The method according to claim 1 wherein in performing step (b), performing the substeps of:
   (b1) during the period when the last set of concurrent bits of the plurality of N words is entered into the array, shifting the last set of concurrent bits of the N words into the storage elements of the array in the predetermined direction so that the N words lie parallel to each other along the first axis of the array; and
   (b2) after the last set of concurrent bits of the N words is entered into the array, transposing the bits stored in storage elements that do not lie on a predetermined diagonal of the array to mirror-image storage elements on the other side of the diagonal to arrange the N words along the second axis of the array.

3. The method according to claim 1 wherein in performing step (b), performing the substep of
   (b1) during the period of the last set of concurrent bits of the plurality of N words, shifting the last set of the N words into the array to their transposed position storage elements while concurrently shifting the bits of the N words already stored in the storage elements of the array into their transposed position storage elements to arrange the N words along the second axis of the array.

4. The method according to claim 1, 2 or 3 wherein N=M and the array is an N×M array of storage elements, and
   in performing step (a) and (c), the array is an N×M array of storage elements and the predetermined bit rate of each of the input and output formats are equal.

5. The method according to claim 1, 2, or 3 wherein in performing steps (a) to (c), the predetermined bit rate of the input and output bit streams are equal and for every N words in the parallel TDM bit stream, inserting a predetermined number of consecutive words comprising the difference between N and M including stuffing bits in the parallel TDM bit stream (1) prior to the N words of the parallel TDM bit stream entering the array when the parallel TDM bit stream is the input bit stream, and (2) by the array when disposing the bits of the N words into their transposed positions in step (b) when the TDM bit stream is the output bit stream.

6. The method according to claims 1, 2, or 3 wherein the number of concurrent bits received at the input of the array from the input serial or parallel bit streams is either lesser or greater than the number of concurrent bits transmitted out of the array in the converted bit streams, wherein in performing step (a), using an array comprising a plurality of subarrays where each subarray comprises a matrix of storage elements arranged with an equal number of storage elements in each row and column of the matrix, the equal number corresponding to the lesser number of concurrent bits received or transmitted by the array and the plurality of subarrays have inputs that are equal to at least the greater number of concurrent bits received or transmitted by the array, and performing the substeps of, (a1) sequentially shifting the corresponding concurrent bits of a first set of concurrent received bits of each of the input bit streams in the predetermined direction into separate storage elements of the subarrays, and (a2) reiterating step (a2) for each of the corresponding bits of at least all but one of the subsequent sets of concurrent bits of each of the input bit streams so that the bits associated with the N words stored in the storage elements are aligned in each of the M subarrays parallel to each other along a first axis of each subarray.

7. The method according to claim 6 wherein in performing steps (a1) and (a2), sequentially shifting each set of received concurrent bits into storage elements of a separate subarray in a predetermined cyclical format when the input bit streams comprise a lesser number of concurrent bits than the output bit streams; and in performing step (c), transmitting each set of converted concurrent bits from the storage elements of a separate subarray in a predetermined cyclical format when the output bit streams comprise a lesser number of concurrent bits than the input bit streams.

8. An arrangement for converting in either direction between (1) a first format comprising a plurality of N concurrent serial bit streams including M-bit words at a first predetermined bit rate, and (2) a second format comprising a parallel Time Division Multiplexed (TDM) bit stream including N sequential M-bit words at a second predetermined bit rate, the arrangement comprising:

a plurality of input terminals, each input terminal being arranged to receive a separate one of a set of the concurrent bits of either one of the first or second format to be converted at the predetermined bit rate of the input bit stream;

an array comprising a plurality of storage elements including (a) a first set of connections for shifting at least all but one of the sets of concurrent bits of the N words from the first plurality of input terminals into and within the array in a predetermined direction so that at least all but one of the concurrent set of bits from the N-words are aligned parallel to each other along a first axis of the array, (b) a second set of connections for shifting the bits of the N words to transposed positions into and within the array so that the N words are aligned parallel to each other in the storage elements along a second orthogonal axis of the array, and (c) a third set of connections for making available the bits of the transposed words at the output of the array at the predetermined bit rate of the output bit stream; and a plurality of output terminals, each output terminal being arranged to receive a separate concurrent bit from the third set of connections of either one of the transposed first or second format.

9. An arrangement according to claim 8 wherein the arrangement further comprises:

means for enabling (a) the first set of connections of the array during the period of the at least all but one set of concurrent bits of the plurality of N words of the first or second format received at the plurality of first input terminals to shift the at least all but one set of concurrent bits of the N received words into the array, and (b) the second set of connections after the last set of concurrent bits have been shifted into the array, for shifting the bits stored in the storage elements to their transposed positions to align the plurality of N words parallel to each other along the second orthogonal axis of the array.

10. An arrangement according to claim 8 wherein the arrangement further comprises:

means for enabling the second set of connections of the array during the period when the last set of concurrent bits of the plurality of N words of the first or second format are received at the plurality of input terminals for (a) shifting the last concurrent set of bits of the N words from the first plurality of input terminals into their transposed positions within the array concurrent with (b) the shifting of the bits of the N words already stored in the storage elements of the array to their transposed positions within the array so that the N words are aligned in parallel along the second orthogonal axis of the array.

11. An arrangement according to claim 8, 9 or 10 wherein $N=M$, the first and second predetermined bit rates are equal and the plurality of storage elements are arranged in an $N \times M$ array.

12. An arrangement according to claim 8, 9 or 10 where the first and second predetermined bit rates are equal, wherein the plurality of storage elements are arranged in the array to form a first and a second group of N lines of M storage elements each, where the first group of N lines is disposed parallel to the first axis of the array and the second group of N lines is disposed parallel to the second orthogonal axis of the array so that the two groups intersect in a subarray of $N \times N$ storage elements, and the TDM parallel bit stream comprises a predetermined number of additional sequential words, comprising the difference between N and M, including stuffing bits.

13. An arrangement according to claim 8, 9 or 10 where the number of concurrent bits received at the plurality of input terminals of the array from the input serial or parallel bit streams is either lesser or greater than the number of concurrent bits transmitted out of the array in the converted bit streams wherein:

the plurality of storage elements of the array are arranged in a plurality of subarrays, each subarray comprising a matrix of storage elements arranged with an equal number of storage elements in each row and column of the matrix, the equal number corresponding to the lesser number of concurrent bits received or transmitted by the array, and the plurality of subarrays have input and output connections that are each equal to at least the greater number of concurrent bits received or transmitted by the array; and the arrangement further comprises means for either sequentially (a) receiving each set of concurrent bits in a different one of the subarrays in a predetermined cyclical subarray sequence when the input bit streams comprise the lesser number of concurrent bits, or (b) transmitting each set of concurrent bits from a different one of the subarrays in a predetermined cyclical subarray sequence when the output bit streams comprise the lesser number of concurrent bits, and for shifting the bits in each subarray at the predetermined bit rate of the bit streams with the greater number of concurrent bits.

* * * * *